United States Patent
Witz et al.

(10) Patent No.: US 8,216,689 B2
(45) Date of Patent: Jul. 10, 2012

(54) MULTILAYER THERMAL BARRIER COATING

(75) Inventors: Gregoire Etienne Witz, Birmenstorf (CH); Hans-Peter Bossmann, Lauchringen (DE); Valery Shklover, Zürich (CH); Sharath Bachegowda, Ennetbaden (CH)

(73) Assignees: ALSTOM Technology Ltd., Baden (CH); ETH Eidgenoessische Technische Hochschule Zuerich, Zurich (CH)

( * ) Notice: Subject to any disclaimer, the term of this patent is extended or adjusted under 35 U.S.C. 154(b) by 375 days.

(21) Appl. No.: 12/471,650

(22) Filed: May 26, 2009

(65) Prior Publication Data
US 2009/0324989 A1    Dec. 31, 2009

(30) Foreign Application Priority Data
May 29, 2008    (EP) .................................. 08104164

(51) Int. Cl.
*B32B 18/00* (2006.01)
*B32B 15/04* (2006.01)
*C23C 4/10* (2006.01)

(52) U.S. Cl. ........ 428/472; 428/613; 428/701; 428/702; 428/704; 427/576; 427/248.1; 427/255.31; 427/419.2; 427/453; 204/192.15

(58) Field of Classification Search .................. None
See application file for complete search history.

(56) References Cited

U.S. PATENT DOCUMENTS

| 5,914,189 A | 6/1999 | Hasz et al. |
| 6,440,575 B1 | 8/2002 | Heimberg et al. |
| 2002/0172838 A1* | 11/2002 | Rigney et al. ................. 428/633 |
| 2003/0157361 A1 | 8/2003 | Nagaraj et al. |
| 2006/0280955 A1 | 12/2006 | Spitsberg et al. |

FOREIGN PATENT DOCUMENTS

| EP | 1788122 | 5/2007 |
| EP | 1806435 | 7/2007 |

OTHER PUBLICATIONS

Search Report for European Patent App. No. 09160349.8 (Jul. 6, 2009).
Search Report for European Patent App. No. 08104164.2 (Nov. 20, 2008).

* cited by examiner

*Primary Examiner* — Aaron Austin
(74) *Attorney, Agent, or Firm* — Cermak Nakajima LLP; Adam J. Cermak

(57) ABSTRACT

Components (1) have a thermal barrier coating (2-6) on the surface thereof, wherein the thermal barrier coating includes at least one layer (3) having chemically stabilized zirconia, and wherein at least indirectly adjacent to the layer (3) with chemically stabilized zirconia and on its surface facing side, there is provided a protective layer (4) and/or a infiltration zone (5) which does not react with environmental contaminant compositions that contain oxides of calcium and which does not react with the material of the layer (3) having chemically stabilized zirconia. Methods for making such components as well as to uses of specific systems for coating thermal barrier coatings, can prevent CMAS.

14 Claims, 2 Drawing Sheets

MULTILAYER THERMAL BARRIER COATING

This application claims priority under 35 U.S.C. §119 to European patent application no. 08104164.2, filed 29 May 2008, the entirety of which is incorporated by reference herein.

BACKGROUND

1. Field of Endeavor

The present invention relates to the field of yttria-based thermal barrier coatings and their protection from calcia-alumina-magnesia silicate (CMAS) attack.

2. Brief Description of the Related Art

A thermal barrier coating (TBC) can be destabilized by environmental contaminants, mostly by calcia-alumina-magnesia silicates (Ca—Mg—Al—SiO, also called CMAS; note that S stands for SiO and not for sulfur) forming a deposit that can react with yttria-stabilized zirconia and lead to the TBC spallation. For a general description of the corresponding mechanisms as perceived in the state-of-the-art, reference is for example made to the introductory portion of U.S. Pat. No. 5,660,885. In recent years several solutions have been proposed in this respect.

U.S. Pat. No. 5,660,885—Protection of thermal barrier coating by a sacrificial surface coating: discloses a sacrificial oxide coating on a thermal barrier coating in an effective amount so that the oxide coating reacts chemically and is consumed by the contaminant composition at an operating temperature of the thermal barrier coating, by raising the melting temperature or viscosity of the contaminant composition, where the sacrificial coating is selected from the group consisting of alumina, magnesia, chromia, calcia, calcium zirconate, scandia, silica, magnesium aluminum oxide, and mixtures thereof.

U.S. Pat. No. 5,773,141—Protected thermal barrier coating composite: discloses a continuous sacrificial oxide coating adjacent to an outer surface of the thermal barrier coating, where the thermal barrier coating is a chemically stabilized zirconia selected from the group consisting of yttria-stabilized zirconia, scandia-stabilized zirconia, calcia-stabilized zirconia, and magnesia-stabilized zirconia, where the sacrificial oxide coating is about 0.2-250 micrometers thick, where the sacrificial oxide coating is not mixed with zirconia, and where the sacrificial coating reacts with contaminant compositions to prevent contaminant infiltration into the thermal barrier coating.

U.S. Pat. No. 5,851,678—Composite thermal barrier coating with impermeable coating: discloses a continuous impermeable barrier coating adjacent to an outer surface of the thermal barrier coating, where the impermeable barrier coating is dense and non-porous and where the impermeable barrier coating is about 0.2-250 micrometers thick, and where the impermeable barrier coating is selected from the group consisting of tantalum oxide, scandium oxide, hafnium oxide, magnesium aluminum oxide, calcium zirconate, silicon carbide, tantalum carbide, titanium carbide, tungsten carbide, silicon oxycarbide, silicon nitride, zirconium nitride, tantalum nitride, boron nitride, chromium silicide, molybdenum silicide, tantalum silicide, titanium silicide, tungsten silicide, zirconium silicde, silver, gold, and alloys thereof.

U.S. Pat. No. 5,871,820—Protection of thermal barrier coating with an impermeable coating: discloses an impermeable coating for protecting TBC (thermal barrier coating) from liquid contaminants and the "impermeable barrier coating is selected from the group consisting of a metal oxide, a metal carbide, a metal nitride, a metal silicide, and mixtures thereof, where the metal oxide coating is selected from the group consisting of silicon oxide, tantalum oxide, scandium oxide, hafnium oxide, magnesium aluminum oxide, and mixtures thereof, where the metal carbide coating is selected from the group consisting of silicon carbide, tantalum carbide, titanium carbide, tungsten carbide, silicon oxycarbide, and mixtures thereof, where the metal nitride coating is selected from the group consisting of silicon nitride, zirconium nitride, tantalum nitride, boron nitride, and mixtures thereof, where the metal silicide coating is selected from the group consisting of chromium silicide, molybdenum silicide, tantalum silicide, titanium silicide, tungsten silicide, zirconium silicide, and mixtures thereof."

U.S. Pat. No. 5,914,189—Protected thermal barrier coating composite with multiple coatings: discloses thermal barrier coated parts which have least two outer protective coatings that decrease infiltration of molten contaminant eutectic mixtures into openings in the thermal barrier coating.

U.S. Pat. No. 6,261,643—Protected thermal barrier coating composite with multiple coatings: discloses a system having two protective layers prepared by depositing an impermeable barrier or sacrificial oxide first coating on the thermal barrier coating, and then depositing at least one other protective second coating that is non-wetting, sacrificial or impermeable on the first coating.

U.S. Pat. No. 6,627,323—Thermal barrier coating resistant to deposits and coating method therefore: discloses "a protective coating system overlying the thermal barrier coating, the protective coating system comprising inner and outer alumina layers and a platinum-group metal layer encased therebetween."

U.S. Pat. No. 6,720,038—Method of forming a coating resistant to deposits and coating formed thereby: discloses a method of forming by PVD a coating containing a mixture of yttria-stabilized zirconia and of alumina that should prevent CMAS infiltration.

U.S. Pat. No. 6,794,059—Multilayer thermal barrier coatings: discloses a porous non-sacrificial top coat for protection against environmental contaminants, in which the top coat is a material selected from the group consisting of carts stabilized zirconia (CSZ); calcium-stabilized zirconia (CaSZ); zirconia toughened alumina (ZTA); a compound oxide comprising two or more compounds from the group consisting of oxides of aluminum, cobalt, chromium, iron, titanium and nickel and mixtures of two or more thereof; and the top coat is selected from materials more resistant to the environmental contaminants than the thermal barrier coating.

U.S. Pat. No. 7,226,668—Thermal barrier coating containing reactive protective materials and method for preparing same: discloses a multilayer system having an outer layer protecting from CMAS attack composed of (1) a CMAS-reactive material in an amount up to 100% and sufficient to protect the thermal barrier coating at least partially against CMAS that becomes deposited on the exposed surface, the CMAS-reactive material having an alkaline earth aluminate, alkaline earth aluminosilicate or mixture thereof, wherein the alkaline earth is selected from the group consisting of barium, strontium and mixtures thereof; and (2) optionally a ceramic thermal barrier coating material.

U.S. Patent Application Publication No. 2006/280955 discloses an article having a silicon-containing substrate, an environmental barrier coating (EBC) overlying the substrate, wherein the EBC includes an outer alkaline earth aluminosilicate barrier layer; and a corrosion resistant alumina/aluminate sealant for the outer barrier layer. A process is also provided for forming a corrosion resistant alumina/aluminate sealant layer over the outer barrier layer of the EBC. Also provided is an alternative process for treating a porous outer barrier layer with a liquid composition including a corrosion resistant alumina/aluminate sealant precursor to infiltrate the porous outer barrier layer with the alumina/aluminate sealant precursor in an amount sufficient to provide, when converted to the corrosion resistant alumina/aluminate sealant, protection of the environmental barrier coating against environmental attack; and converting the infiltrated alumina/aluminate sealant precursor within the porous outer barrier layer to the corrosion resistant alumina/aluminate sealant. The document clearly states that sulfates are corrosive species and in many text portions mentions 'sulfates and/or chlorides of calcium, magnesium, sodium, etc.,' which includes $CaSO_4$ as a corrosive species.

Most of these documents disclose materials that should react with the liquid deposit forming a solid phase that should not infiltrate the TBC. The other documents describe impermeable coatings that should prevent the liquid infiltration.

SUMMARY

One of numerous aspects of the present invention includes an improved thermal barrier coating for components which are exposed to hot air flows as, for example, in gas turbines. Specifically the thermal barrier coating is improved with respect to resistance to environmental contaminant compositions that contain oxides of calcium, so thermal barrier coatings are less prone to CMAS attack. Furthermore, another aspect includes methods for making such thermal barrier coatings and to uses of specific systems as protective layers for barrier coatings.

Another aspect of the present invention relates to a barrier coating structure, or more specifically to a component with a thermal barrier coating on the surface thereof, wherein the thermal barrier coating comprises at least one layer comprising chemically stabilized zirconia. According to other aspects of the invention, such a barrier coating structure is in particular characterized in that at least indirectly adjacent to the layer comprising chemically stabilized zirconia and on its surface facing side (that is, on the side which directly or indirectly faces the hot air streams and is therefore exposed to the above-mentioned contaminants), there is provided a protective layer. This can actually be a true protective layer which is separate; it may, however, also be an infiltration zone, in which a protective material penetrates into the layer comprising chemically stabilized zirconia. The protective layer, the infiltration zone, or generally speaking the protective material, is characterized in that it is not reacting with environmental contaminant compositions that contain oxides of calcium and which is not reacting with the material of the layer comprising chemically stabilized zirconia.

Thermal barrier coatings can be destabilized by environmental contaminants, mostly by calcia-alumina-magnesia silicates (CMAS) forming a deposit that can react with yttria-stabilized zirconia and lead to TBC spallation.

The CMAS attack mechanism has been identified to proceed through Ca diffusion in the YSZ leading to its destabilization even through solid-state reaction. The TBC degradation mechanism does not need to involve a molten deposit, as always assumed up to now; it can happen through gaseous contaminants reacting directly with YSZ leading to Ca-infiltration in the YSZ. The diffusion of Ca in the YSZ layer changes the microstructure of the as-deposited, partially stabilized zirconia with 6-8 wt % yttria leading to an increased content of fully stabilized zirconia. This increased content of fully stabilized zirconia leads to an increase of residual stresses in the TBC and the destabilization of the TBC layer and its spallation.

Therefore, the mitigation mechanism cannot efficiently rely on proposed solutions according to the state-of-the-art of impermeable or sacrificial coatings protecting from molten deposit contamination. What is needed is a layer or a system which does not react with the environmental contaminant compositions and which also does not react with the material of the layer comprising chemically stabilized zirconia. It is therefore not necessary that such a protective material/layer is impermeable or sacrificial as always described to be necessary and crucial in the systems according to the state-of-the-art. Quite by contrast, what is important is that the material of the protective layer/infiltration zone neither reacts with environmental contaminant compositions that contain oxides of calcium, specifically CMAS, nor reacts with the TBC material. Preferably, in addition to that it shows a low diffusion coefficient for calcium coming from the combustion environment, it shows an essentially vanishing diffusion coefficient for calcium coming from the combustion environment.

Ca has been demonstrated to diffuse through a solid-state process from the combustion environment to the yttria-stabilized zirconia (YSZ) TBC layer. In yttria-stabilized zirconia coatings that have been coated with systems embodying principles of the present invention, for example calcium sulphate ($CaSO_4$), no Ca diffusion into the TBC layer has been observed (diffusion coefficient essentially zero), and correspondingly the underlying TBC layers are highly protected from the above-mentioned CMAS attack. Also Ca-containing protective compositions have a reduced diffusion coefficient for Ca coming from the combustion environment and can fulfill the same function.

Solutions in accordance with the present invention thus rely on CMAS attack mitigation by using an outer layer that does not react with Ca. This could be performed using an outer layer having a high Ca content, but also other materials known to be inert with respect to CaO.

The inventors hereof also observed experimentally that when $CaSO_4$ was present, it did not react with YSZ.

Typically such a protective layer has a thickness in the range of 10-2000 micro meter, preferably in the range of 10-100 micro meter. Preferably, the protective layer and/or the infiltration zone, cover the component over the full surface which is exposed to the hot air streams/combustion air stream. It is, however, also possible that the protective layer and/or the infiltration zone only covers the most exposed areas.

Under the expression "protective layer" a true essentially contiguous/continuous layer structure is to be understood, protecting/covering an essential part, if not all of the surface exposed to the hot gas pathway, and which protective layer prevents CMAS-attack. Preferably, therefore, the protective layer forms a contiguous layer covering all of the chemically stabilized zirconia layer on the component.

According to a first preferred embodiment of the component according to principles of the present invention, the protective layer comprises a calcium system selected from the group of: calcium sulphate, calcium-doped $SrZrO_3$, strontium-doped $CaZrO_3$. Also, other systems are possible, such as calcium stabilized zirconia, $SrZrO_3$, $CaZrO_3$ as outer layers. A preferred system, however, is a system which comprises calcium sulphate, most preferably the protective material consists essentially of calcium sulphate. Indeed a layer or infiltration zone of calcium sulphate shows an almost complete barrier effect with respect to calcium diffusion (essentially zero diffusion coefficient), in spite of the fact that this layer can be permeable for other constituents.

As mentioned above, U.S. Patent Application Publication No. 2006/10280955 A1 states that sulfates are corrosive species. U.S. Patent Application Publication No. 2007/10160859 briefly mentions $SO_2$ as a contaminant gas and EP 178122 mentions aluminum sulfate as a precursor for the production of alumina, but also mentions that sulfates are corrosive species. Also, in other literature, one finds mentions of $CaSO_4$ as a corrosive species, for instance hydrated $CaSO_4$ is known to be used as one of the constituents of the FVV-slag. Clearly $CaSO_4$ is not considered as a corrosion protection material in the state of the art. Also, it is not referred to as a constituent of the CMAS, and sulfur is only mentioned in certain documents as a possible contaminant, and as a corrosive species and another environmental barrier coating should provide protection against it.

According to a further embodiment of the invention, the protective layer is directly adjacent to the layer comprising chemically stabilized zirconia.

Preferably, the layer comprising chemically stabilized zirconia is selected from the group consisting of: yttria-stabilized zirconia, scandia-stabilized zirconia, calcia-stabilized zirconia, and magnesia-stabilized zirconia or combinations thereof. It is preferred if the layer comprising chemically stabilized zirconia consists essentially of yttria-stabilized zirconia.

It is further possible that on the side of the layer comprising chemically stabilized zirconia facing the protective layer, there is an infiltration zone in which the material of the protective layer penetrates into the pores of the layer comprising chemically stabilized zirconia. As already mentioned above, indeed it is even sometimes sufficient if there is provided such an infiltration zone without an actual protective layer, as long as this infiltration zone essentially covers the topmost surface structure of the thermal barrier coating lying underneath, protecting it from the contaminant substances. Typically, such an infiltration zone, be it alone or be it in combination with an additional protective layer, is in the range of 10-100 micrometers in thickness.

The protective layer and/or the infiltration zone can be the final and exposed layer of the thermal barrier coating structure. It is, however, also possible that, on the surface-facing side of the protective layer, further layer structures are provided. It is preferred that the protective layer and/or the infiltration zone directly adjacent to the layer comprising chemically stabilized zirconia are the outermost layer of the thermal barrier coating structure which is exposed to the hot contaminant air stream.

As mentioned above, the component can, for example, be a gas turbine component exposed to compression/combustion air streams. It is, for example, possible that it is a housing or guide element or combustion chamber tile or a part or a component thereof. It is also possible that the component is a blade or part or component thereof, or a vane or part or component thereof.

The present invention furthermore relates to a method for making a component as described above. Preferably this method is characterized in that a component provided with at least one layer comprising chemically stabilized zirconia (preferably, YSZ) is coated with a protective layer using a coating process selected from: slurry coating; thermal spray coating; physical vapor deposition; chemical vapor deposition; depositing CaO and reacting it in a furnace with a controlled atmosphere containing between 10 Pa and 1000 Pa of $SO_2$, and 100 Pa to 25 kPa of $O_2$ at a temperature ranging from 300° C. to 800° C. $CaSO_4$ or $CaSO_4.2H_2O$ can also be directly deposited in the form of a layer on the coating as a protective layer.

It is to be noted that only if specific processing conditions are present the formation of such a useful protective layer from CaO takes place. In fact, $CaSO_4$ can be formed only under such specific conditions, i.e., when an exceptionally high sulfur content is present in the atmosphere as given in the above processing conditions. Such a high sulphur content is never achieved under normal operating conditions in a gas turbine.

$CaSO_4$ is thus not a normal product found in a gas turbine under CMAS attack. When CMAS attack occurs, the S amount is not enough to react with all the CaO present. So even if a gas turbine is operated with sands, quartz ($SiO_2$) is the predominant sand constituent, as well as limestone (mostly $CaCO_3$), feldspar, chlorite, glauconite (all three are silicates), and all these materials do not contain sulfur (or only as a minor contaminant). Sands composed of these materials do not produce $CaSO_4$ to an extent which would lead to layer with a protection effect.

As can be seen from the above-referred patent documents of the state of the art, $CaSO_4$ is not considered as a common product that can be formed in a gas turbine under CMAS attack. The only patent mentioning $CaSO_4$, namely U.S. Patent Application Publication No. 2006/0280955, refers to it as a contaminant and it does not mention a mixture of sulfate and CMAS, and certainly not as a CMAS constituent or a protective layer.

For the person skilled in the art, $CaSO_4$ is thus not considered as a product found in a gas turbine under CMAS attack, let alone forming a protective layer. In fact $CaSO_4$ can be formed from CaO only under very specific conditions.

Preferably, the component provided with at least one layer comprising chemically stabilized zirconia is made in that the component, typically made of superalloy, is preferably grit blasted, bond coat deposited for example by atmospheric plasma spray or high velocity oxygen fuel thermal spray and subsequently chemically stabilised zirconia, preferably yttria-stabilized zirconia thermal barrier coat deposited by plasma spraying.

The present invention furthermore relates to the use of a number of systems for the prevention of calcium diffusion into the thermal barrier coating layer comprising chemically stabilized zirconia. The proposed systems are selected from the group of: calcia stabilized zirconia, $CaSO_4$, $SrZrO_3$, $CaZrO_3$, Ca-doped $SrZrO_3$, Sr-doped $CaZrO_3$, in an outer zone of a thermal barrier coating comprising chemically stabilized zirconia of a component and/or as a protective layer of the thermal barrier coating comprising chemically stabilized zirconia. Preferably, calcium sulphate is used as a protective layer consisting essentially of calcium sulphate only on a thermal barrier coating layer consisting essentially of yttria-stabilized zirconia.

BRIEF DESCRIPTION OF THE DRAWINGS

In the accompanying drawings preferred embodiments of the invention are shown in which.

DETAILED DESCRIPTION OF EXEMPLARY EMBODIMENTS

Figure 1:
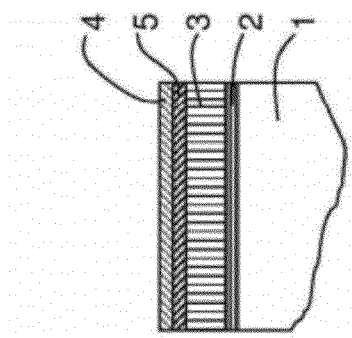
FIG. 1 is a schematic cut through a component having a thermal barrier coating according to the invention.

Referring to the drawings, which are for the purpose of illustrating the present preferred embodiments of the invention and not for the purpose of limiting the same, FIG. 1 shows a partial area cut through a possible component structure.

The structure includes base metal of the component 1. On this base metal normally there is provided a bond coat layer 2 for adhesively attaching the subsequent ceramic thermal barrier coating layer 3 made of YSZ or analogous systems. According to exemplary embodiments of the invention, as a top layer there is provided a calcium sulfate layer 4 as a protective layer.

It is to be noted that the thermal barrier coating layer 3 may be a structure having several individual identical or different material layers of barrier coating material.

Figure 2:
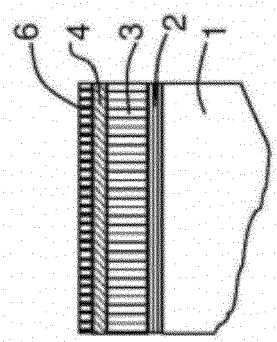
FIG. 2 is a schematic cut through a component according to FIG. 1, indicating the infiltration zone.

As indicated schematically in FIG. 2, normally, in particular when using liquid infiltration or dip coating for applying the protective layer 4, an infiltration zone 5 is formed, which is a region in the thermal barrier coating layer 3 in which the material of the protective layer 4 penetrates into the pores of the thermal barrier coating layer surface. Such an infiltration zone 5 may have a thickness in the range of 10-100 micrometers. As already discussed above, the actual protective layer 4 may even be formed of such an infiltration zone only, as long as such an infiltration zone indeed provides the inventive shielding from calcium diffusion into the thermal barrier coating layer 3.

Figure 3:
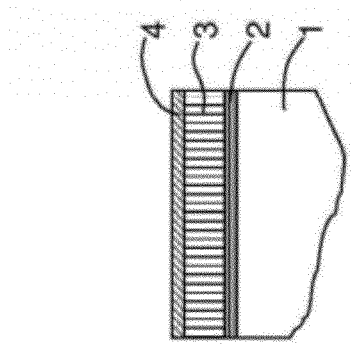
FIG. 3 is a schematic cut through a component according to FIG. 1 with an additional layer on top of the protective layer.

As furthermore indicated schematically in FIG. 3, the protective layer 4 (with or without infiltration zone) does not necessarily have to be the topmost layer which is directly exposed to the combustion air, for example in a gas turbine. It is possible that additional layers 6 are provided on top of the protective layer 4.

For the sake of completeness, it is furthermore pointed out that the idea of the protective layer 4 is to shield a layer of thermal barrier coating material (preferably YSZ) from calcium diffusing into it. Correspondingly, therefore, while it is preferred that such a protective layer (or infiltration zone) is immediately adjacent to the thermal barrier coating layer 2, this is, however, not necessary. It is also possible that between the thermal barrier coating layer 2 and a protective layer 4 there is provided one or several additional layers.

From these considerations, systems embodying principles of the present invention propose solutions for preventing the CMAS attack:

1) Using calcia-stabilized zirconia in the outer layer of the TBC instead of yttria-stabilized zirconia
2) Depositing a CaSO$_4$ layer on top on the TBC to protect it from CMAS attack
3) Using SrZrO$_3$, CaZrO$_3$, Ca-doped SrZrO$_3$, or Sr-doped CaZrO$_3$ in the outer layer of the TBC.

All solutions can be used independently or together, and the multilayer system can be used also in a graded layer system. The outer layer can be used as a top layer but also can infiltrate the pores of the TBC up to 100 μm allowing the use of liquid infiltration or dip coating as a deposition method. The materials proposed in solutions 1), 2), and 3) have also the advantage of having a thermal expansion coefficient close to that of yttria-stabilized zirconia ($10^{-6}$ K$^{-1}$), which allows the formation of a protective layer that will not crack upon thermal cycling.

Description of possible components and coatings, CaSO$_4$ coated:

A superalloy substrate, a bondcoat deposited either by APS (atmospheric plasma spray) or HVOF (High velocity oxygen fuel thermal spray), an yttria-stabilized zirconia thermal barrier coating deposited by plasma spray, and a CaSO$_4$ environmental barrier coating deposited by one of the following methods:

1) slurry coating
2) thermal spray
3) PVD (physical vapor deposition)
4) CVD (chemical vapor deposition)
5) Depositing CaO and reacting it in a SO$_2$ containing atmosphere Description of possible components and coatings, CaZrO$_3$, or Ca-stabilized zirconia coated:

Gas turbine (GT) parts made of superalloy prepared by grit blasting, a bondcoat deposited either by APS (atmospheric plasma spray) or HVOF (High velocity oxygen fuel thermal spray), a yttria-stabilized zirconia thermal barrier coating deposited by plasma spray, and a CaZrO$_3$ or Ca-Stabilized zirconia environmental barrier coating deposited by plasma spray Possible parts coated with environmental barrier coatings according to the present invention can be: combustion chamber tiles; vanes; blades and so forth.

Experimental Section:

Using the above-mentioned procedure for the formation of a calcium sulphate protection layer on a thermal barrier coating layer (YSZ) a standard gas turbine component YSZ thermal barrier coating layer 3 was coated with a calcium sulphate protection layer 4 and then subjected to testing conditions.

The corresponding protection effect was tested during extended operation (8000 h at average TBC surface temperature of above 1000° C.) in a gas turbine under standard conditions.

Figure 5:
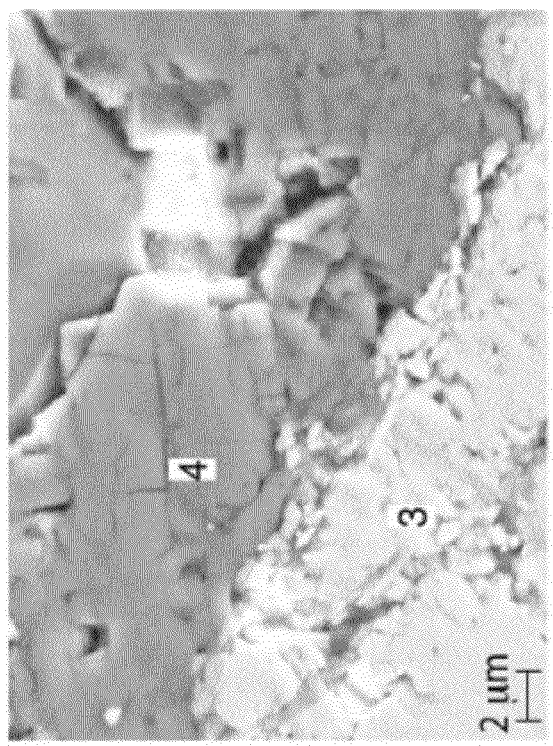
FIG. 5 is an interface layer between YSZ (bottom left) and CaSO$_4$ (darker layer) in an ex-service TBC showing no reaction layer at the interface.
Figure 4:
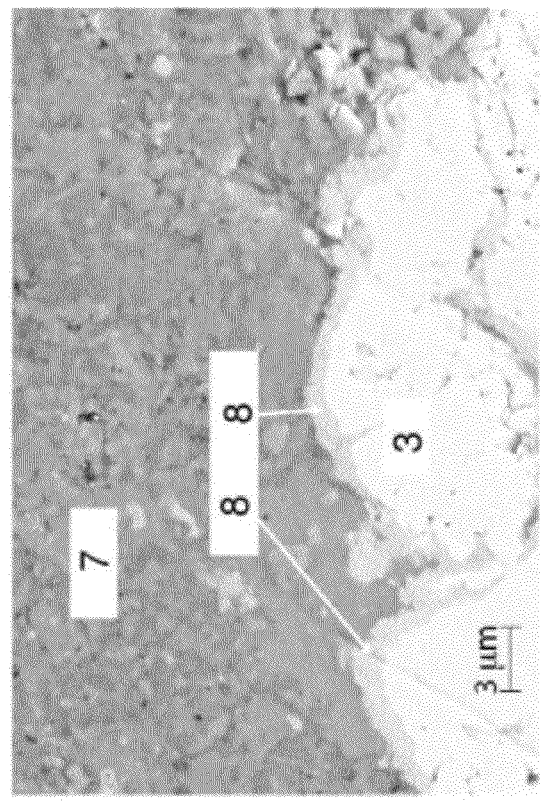
FIG. 4 is a cross-section of YSZ-CMAS interface in an ex-service TBC, showing a reaction layer at the interface.

With reference to FIGS. 4 and 5, a comparison between standard CMAS layer-formation on the surface of an YSZ thermal barrier coating layer and of a protection layer according to the invention shall be given.

FIG. 4 shows a cross-section of an YSZ-CMAS interface in an ex-service TBC, showing a reaction layer at the interface. In this figure the TBC 3 at the interface with the CMAS deposit layer 7 shows a reaction layer 8 containing Zr, Y, but also Ca, Mg, and some other compounds coming from the CMAS deposits. Element analysis performed in the TBC below shows Ca content up to 10 wt %. Several weight % of Ca can be observed in the TBC even 10-20 microns away from the interface.

FIG. 5 shows an interface layer between YSZ 3 (bottom left) and CaSO$_4$ 4 (darker layer) in an ex-service TBC showing no reaction layer at the interface. In samples where a CaSO$_4$ layer was present, no reaction layer 8 was observed. 10 microns away from the interface, the Ca content of the TBC was below 1 wt %, around the detection limit/noise level of the EDX system.

Without being bound to any theoretical explanation, the reduced reaction of CaSO$_4$ with TBC than that of CMAS with TBC, can be explained by the following considerations:

CMAS contains significant amounts of CaO (not CaSO$_4$!), and its content can be up to 35 wt % and even higher. CaO can diffuse into the YSZ, and leads to an increased content of stabilizing elements in the YSZ structure leading to a modification of the phase composition of the YSZ toward cubic zirconia. An increase of cubic zirconia content is observed in X-Ray diffraction in ex-service samples that were in direct contact with CMAS, showing clearly that the TBC contains a higher content of stabilizing elements than in the as-deposited TBC, leading in turn to the increase of residual stresses in the TBC layer and to the destabilization of the TBC layer and its spallation.

As $CaSO_4$ is not soluble in YSZ, the incorporation of Ca in YSZ from $CaSO_4$ would have to proceed by a first step of transformation from $CaSO_4 \rightarrow CaO$ and then by the incorporation of CaO in the TBC. The first reaction does not occur under engine conditions, because of the extremely low sulfur content required to decompose $CaSO_4$ at temperature up to 1200° C. (below 1 ppm of $SO_2$). In engines where CMAS ingress occurs, $SO_2$ content is on the other hand not high enough to transform CaO into $CaSO_4$, and the $SO_2$ content is not low enough to allow the decomposition of existing $CaSO_4$ into CaO. From X-Ray diffraction, it can be observed that ex-service TBC samples that were coated with $CaSO_4$ did not show any indication of an increase of their content of stabilizing elements

LIST OF REFERENCE NUMERALS 1 base metal/component
2 bond coat layer
3 thermal barrier coating layer
4 calcium sulphate layer
5 infiltration zone
6 additional layer
7 CMAS deposit layer
8 reaction layer While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A component comprising:
    a base metal having a surface;
    a thermal barrier coating on the base metal surface, wherein the thermal barrier coating comprises at least one layer comprising chemically stabilized zirconia; and
    a protective layer, an infiltration zone, or both, which does not react with environmental contaminant compositions that contain oxides of calcium and which does not react with the material of the at least one layer comprising chemically stabilized zirconia, said protective layer, infiltration zone, or both located on a side of the at least one layer comprising chemically stabilized zirconia opposite said base metal;
    wherein the protective layer, the infiltration zone, or both, comprises calcium sulfate.

2. A component according to claim 1, wherein the protective layer consists essentially of calcium sulfate.

3. A component according to claim 1, wherein the protective layer is directly adjacent to the layer comprising chemically stabilized zirconia.

4. A component according to claim 1, wherein the chemically stabilized zirconia is selected from the group consisting of yttria-stabilized zirconia, scandia-stabilized zirconia, calcia-stabilized zirconia, and combinations thereof.

5. A component according to claim 1, wherein the chemically stabilized zirconia consists essentially of yttria-stabilized zirconia.

6. A component according to claim 1, wherein:
    the at least one layer comprising chemically stabilized zirconia comprises pores; and further comprising:
    in said infiltration zone the material of the protective layer penetrates into the pores of the at least one layer comprising chemically stabilized zirconia.

7. A component according to claim 6, wherein the infiltration zone has a thickness in the range of 10-100 micrometers.

8. A component according to claim 1, wherein the protective layer is permeable and not sacrificial.

9. A component according to claim 1, wherein a side of the protective layer opposite the at least one layer comprising chemically stabilized zirconia is an outer surface of the component.

10. A component according to claim 1, wherein the component comprises a gas turbine component, or component thereof, exposed to compression or combustion air streams selected from the group consisting of a housing, a guide element, a combustion chamber tile, a blade, and a vane.

11. A method for making a component, the method comprising:
    providing a component with at least one layer comprising chemically stabilized zirconia;
    coating the component with a protective layer, said coating comprising depositing $CaSO_4$ or $CaSO_4\text{-}2H_2O$ using a coating process selected from the group consisting of slurry coating, thermal spray coating, physical vapor deposition, chemical vapor deposition.

12. A method according to claim 11, wherein the component comprises a superalloy, and further comprising:
    grit blasting the component;
    depositing a bond coat on the component by atmospheric plasma spray or high velocity oxygen fuel thermal spray; and
    depositing a yttria-stabilized zirconia thermal barrier coat by plasma spraying after said depositing a bond coat.

13. A method of preventing calcium diffusion in a thermal barrier coating layer having chemically stabilized zirconia of a component, the method comprising:
    providing $CaSO_4$ in an outer zone of the thermal barrier coating, in a protective layer of the thermal barrier coating, or in both.

14. The method according to claim 13, wherein the protective layer consists essentially of calcium sulphate and the thermal barrier coating layer consists essentially of yttria-stabilized zirconia.

* * * * *